Aug. 24, 1965

E. E. POWELL 3,202,323

REMOTELY CONTROLLED CHANGE SPEED FEED CONTROL
FOR AGRICULTURAL MACHINES

Filed Oct. 18, 1963

Emmit E. Powell
INVENTOR.

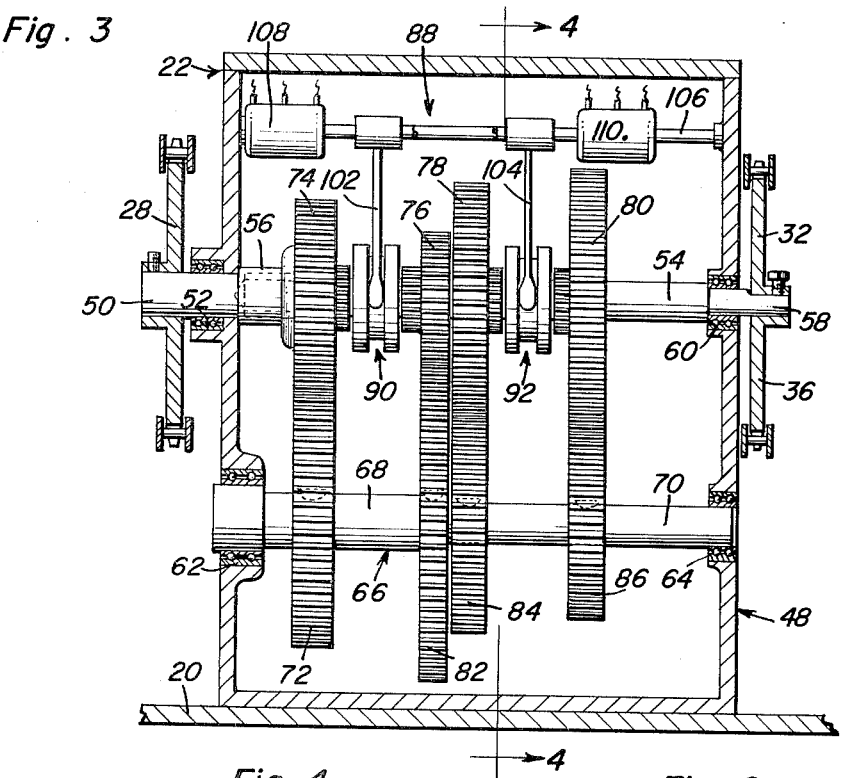
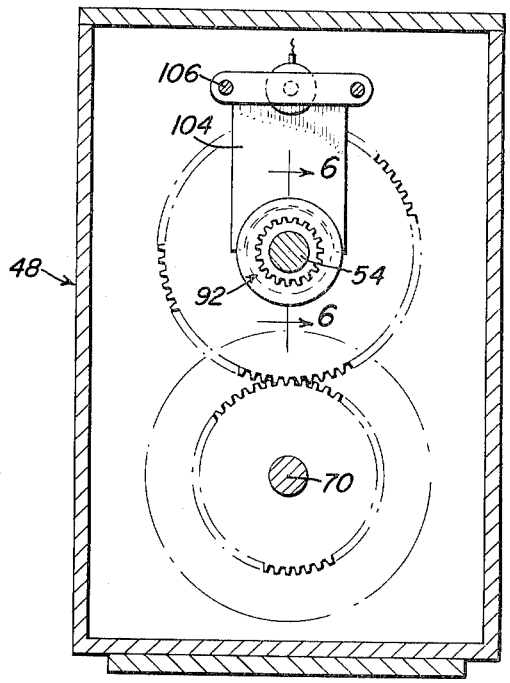
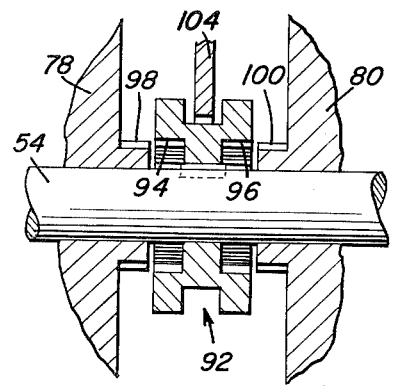

3,202,323
REMOTELY CONTROLLED CHANGE SPEED FEED CONTROL FOR AGRICULTURAL MACHINES
Emmit E. Powell, Bloomfield, N. Mex.
(R.R. 2, Heyworth, Ill.)
Filed Oct. 18, 1963, Ser. No. 317,256
6 Claims. (Cl. 222—177)

This invention relates to material distributing apparatus such as seed planters, fertilizer spreaders, etc.

A primary object of the present invention is to provide improved material distributing apparatus useful in connection with agricultural operations, whereby the rate of feed or discharge of the material may be more easily and accurately controlled in accordance with varying requirements and needs.

In accordance with the foregoing object, the apparatus of the present invention relates to facilities for changing the discharge or feed rate of material from a material distributing mechanism under control of the operator. In this manner, the rate of discharge may be varied in connection with the spacing of seed for example or the density with which fertilizer is to be spread. Although facilities have heretofore been provided for changing the rate of distribution of such distributing mecahnism, this necessitated stopping of the towing vehicle or tractor in order to make the requisite readjustment in the feed rate. However, in accordance with the present invention, such change in the rate of distribution may be effected without interruption in the movement of the vehicle. Also, the vehicle operator may selectively effect a change in the rate of distribution of the material without leaving the operator's seat or station.

A further object of the present invention in accordance with the foregoing objects, is to provide remote control facilities for controlling the operation of a trailer mounted distributing mechanism from the towing vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged partial sectional view taken substantially through a plane indicated by section line 3—3 in FIGURE 1.

FIGURE 4 is a sectional view taken substantially through a plane indicated by section line 4—4 in FIGURE 3.

FIGURE 6 is a partial sectional view taken substantially through a plane indicated by section line 6—6 in FIGURE 4.

Figure 1:
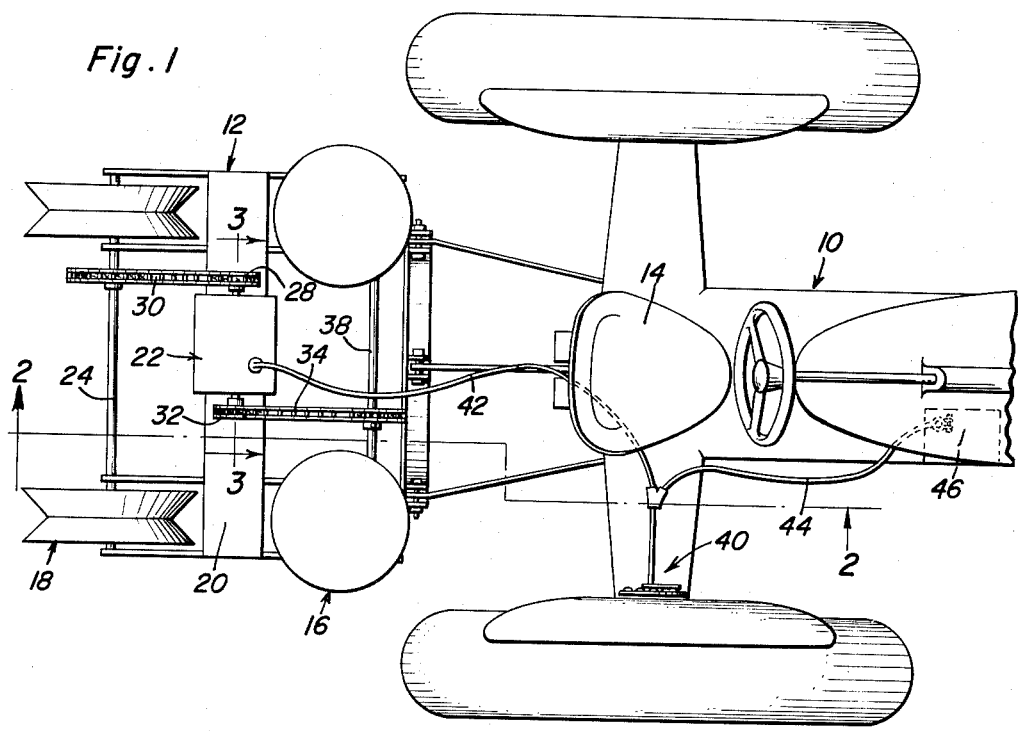
FIGURE 1 is a top plan view of one form of apparatus constructed in acordance with the principles of the present invention.
Figure 2:
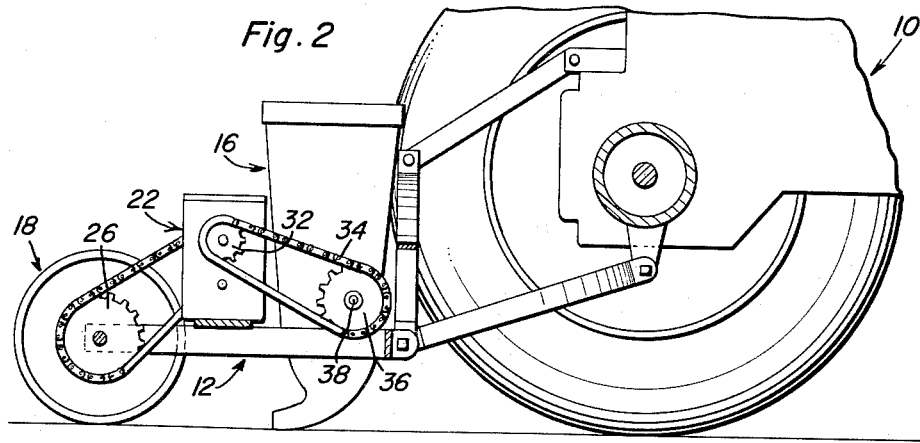
FIGURE 2 is a side sectional view taken substantially through a plane indicated by section line 2—2 in FIGURE 1.

Referring now to the drawings in detail, it will be observed from FIGURES 1 and 2, that the apparatus of the present invention is associated with a towing vehicle or tractor generally referred to by a reference numeral 10 of any suitable type to which a trailer structure 12 is adapted to be hitched. The towing vehicle 10 is accordingly provided with an operator's seat 14 from which the operator exercises control over the vehicle 10 in a manner well known and from which the operator may also control a pair of material distributing mechanisms 16 which in the exemplary illustration is of the seed planter type.

The trailer structure 12 hitched to the rear end portion of the vehicle 10 and rearwardly of the operator's seat 14 is supported above the ground by a pair of traction wheel assemblies 18 by means of which the distributing mechanisms 16 are ordinarily driven in response to movement of the trailer 12 by the towing vehicle 10. However, in accordance with the present invention, the trailer structure 12 is provided with a supporting platform 20 on which there is mounted a plural speed transmission 22 so as to drivingly connect the traction wheel assemblies 18 with the distributing mechanisms 16 for drive thereof. Toward this end, the traction wheel assemblies are interconnected by a shaft 24 to which the sprocket wheel 26 is connected, the sprocket wheel 26 being drivingly connected to the input sprocket wheel 28 of the transmission by the endless sprocket chain 30. The output sprocket wheel 32 of the transmission is in turn drivingly connected by the endless sprocket chain 34 to the drive sprocket 36, connected to the drive shaft 38 for the distributing mechanisms 16. The transmission 22 is controlled by the vehicle operator through a remote control device 40 mounted on the vehicle within reach of the operator from the operator's seat 14. Accordingly, the remote control device 40 is associated with an electrical conduit 42 extending therefrom to the transmission 22 and an electrical conduit 44 extending to a source of electrical energy such as the battery 46 mounted at any suitable location on the vehicle 10.

Referring now to FIGURES 3, 4 and 6 in particular, it will be observed that the transmission 22 includes any suitable gear housing 48. An input shaft 50 is journaled by the housing by the bearing assembly 52 and extends therefrom for connection to the input sprocket wheel 28. An output shaft 54 is axially aligned with the input shaft 50 and is piloted at one end within a socket portion 56 of the input shaft by needle bearings, the opposite end section 58 of the output shaft being journaled by the housing bearing assembly 60 and having the output sprocket wheel 32 connected thereto. Also journaled within the gear housing 48 between the end wall bearing assemblies 62 and 64 is a countershaft assembly 66 having a large diameter portion 68 and a smaller diameter portion 70 to which a plurality of countershaft gears are splined. Thus, the section 68 of the countershaft has a gear 72 rotatable therewith, said gear 72 meshing with a main drive gear 74 fixed to the inner end of the input shaft 50. Axially fixed on the output shaft 54 but freely rotatable with respect thereto are gear members 76, 78 and 80. Countershaft gear 82 meshes with the gear member 76, countershaft gear 84 meshes with gear member 78 and countershaft gear 86 meshes with gear member 80. It will therefore become apparent, that a plurality of different speed ratios may be obtained when the transmission 22 is rendered operative to transmit power between the input shaft 50 and the output shaft 54. Selection of the drive ratio of the transmission is effected through a ratio changing mechanism generally referred to by reference numeral 88.

The ratio changing mechanism 88 includes a pair of axially spaced clutch members 90 and 92 splined to the output shaft and slidably shiftable between a pair of gear members so as to alternatively couple one of the gear members to the output shaft. As more clearly seen in FIGURE 6, each of the clutch members is therefore provided with axially spaced internal clutch teeth 94 and 96 adapted to respectively engage external clutch teeth 98 and 100 on the gear members between which the clutch member is shiftable. Thus, in the position illustrated in FIGURE 6, the clutch member 92 is in a neutral position so that neither of the gear members 78 and 80 associated therewith is coupled to the output shaft 54. Shifting of the clutch member in one direction will thereby couple gear member 78 to the output shaft 54 or gear member 80 when the clutch member is shifted in the opposite direction. Each of the clutch members is therefore associated with a shifting fork 102 and 104. A pair of guide rails 106 is also mounted within the gear housing so as to guide shifting movement of the shifting forks 102 and 104 thereon. Also fixedly mounted within the housing between the guide rails and connected to the respective shifting forks are a pair of reversible electromagnet devices 108 and 110. The electromagnetic devices may therefore be energized for shifting of the respective clutch members in opposite directions so as to effect drive through the transmission at a selected speed ratio. For example, when the clutch member 92 is shifted in a right hand direction as viewed in FIGURE 3 to an operative position, by energization of the electromagnetic device 110 in one direction, drive will proceed through the transmission from the input shaft via gear member 74 meshing with countershaft gear 72 through the countershaft 66 and from countershaft gear 86 meshing with gear member 80 to the output shaft at a reduction drive ratio of 5.32. When the electromagnetic device 110 is energized in the opposite direction so as to shift the clutch member 92 leftward to the other operative position thereof, drive will then proceed from the countershaft 66 through gear 84 meshing with gear member 78 to the output shaft at a reduction drive ratio of 3.62. In order to obtain a third reduction drive ratio, the clutch member 92 will be held in a neutral position and the clutch member 90 shifted toward the right as viewed in FIGURE 3 so as to couple gear member 76 to the output shaft in order to transmit drive from the countershaft 66 through countershaft gear 82 through gear member 76 in mesh therewith. A reduction drive ratio of 2.75 is thereby obtained. Finally, a one-to-one ratio is obtained when the clutch member 90 is shifted in a leftward direction as viewed in FIGURE 3 by energization of the electromagnetic device 108 in the other direction resulting in the direct connection of the main drive gear 74 to the output shaft. It will therefore be appreciated that a different drive ratio varying from a very high reduction ratio to a one-to-one drive ratio is obtained for each operative position of the pair of clutch members 90 and 92. It will therefore also be apparent that when both clutch members are in their neutral position with the electromagnetic devices 108 and 110 deenergized, drive through the transmission will be interrupted so as to also interrupt drive of the material distributing mechanisms associated therewith.

Figure 5:
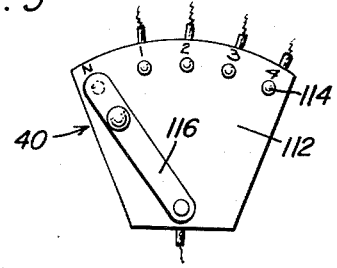
FIGURE 5 is a front elevational view of a portion of the remote control apparatus.

Energization of the eelctromagnetic devices 108 and 110 for effecting the changes in the drive ratio of the transmission as well as to interrupt drive therethrough, is under control of the vehicle operator by means of the remote control selector 40. Accordingly, as more clearly seen in FIGURE 5, a switch plate 112 is fixedly mounted on the vehicle within reach of the vehicle operator, the switch plate mounting a plurality of switch contacts 114 aproprirately labelled and adapted to be engaged by a selector 116 pivotally mounted on the switch plate. Accordingly, each of the operative contacts 114 when engaged by the selector 116 will establish a different circuit in order to effect energization of the electromagnetic device 108 or 110 in one direction or the other and thereby select the drive ratio of the transmission. Also, the selector may be disposed in a position wherein both electromagnetic devices are deenergized so as to interrupt the drive through the transmission. Power for energizing the electromagnetic devices through the circuits established by the remote control selector 40, is derived from the battery 46 as aforementioned.

From the foregoing description, the construction, operation and utility of the apparatus of the present invention will be apparent. It will therefore be appreciated, that the apparatus of the present invention provides facilities for changing the feed rate or discharge rate from material distributing mechanisms while the towing vehicle is moving and under direct control of the vehicle operator without requiring the operator to dismount from the vehicle. Immediate and accurate control over the distribution rate is thereby obtained without any loss in time or need for apparatus adjustment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a towing vehicle having an operator's station thereon and a trailer hitched to the vehicle for mounting a material distributing mechanism, means for controlling the rate of discharge of material from said distributing mechanism comprising; a step ratio transmission mounted on said trailer and having a plurality of speed ratios and a neutral condition interrupting drive of the distributing mechanism, power operated ratio changing means operatively connected to the transmission for altering the speed ratio thereof, means drivingly connecting the transmission between the distributing mechanism and the trailer for drive of the distributing mechanism in response to movement of the trailer at a selected speed ratio to said movement, and remote control means mounted on the vehicle adjacent said operator's station and operatively connected to the ratio changing means for controlling operation of the distributing mechanism and changing the speed ratio of the transmission without stoping movement of the vehicle.

2. The combination of claim 1 wherein said power operated ratio changing means comprises, a pair of clutch members alternatively displaceable between two operative positions to render the transmission operative in at least four different speed ratios, electromagnetic means operatively connected to said clutch members for displacement thereof between said operative positions and a source of electrical energy mounted on the towing vehicle and operatively connected by the remote control means to the electromagnetic means for energization thereof.

3. The combination of claim 2 wherein said remote control means comprises, a multi-contact switch plate mounted on the vehicle, a selector member movably mounted on the switch plate for establishing a plurality of circuits between said ratio changing means and said source of electrical energy for energizing the ratio changing means.

4. The combination of claim 1 wherein said remote control means comprises, a multi-contact switch plate mounted on the vehicle, and a selector member movably mounted on the switch plate for establishing a plurality of energizing circuits for said ratio changing means.

5. In combination with a moving vehicle having a traction wheel and a material distributing mechanism driven in response to movement of said vehicle, positive gear transmission means drivingly connected to said traction wheel for driving the distributing mechanism in one direction only at a plurality of selected drive ratios, and remote control means operatively connected to the transmission means for changing the drive ratio thereof during motion of the vehicle.

6. In combination with a towing vehicle and a trailer hitched thereto having a traction wheel: a material distributing mechanism mounted on the trailer, a step ratio gear transmission having a plurality of fixed drive ratios and a neutral condition, means mounting said transmission on the trailer, means drivingly connecting the transmission to the traction wheel and the material distributing mechanism for transmitting movement through the transmission in proportion to vehicle movement at one of said drive ratios, power operated ratio changing means operatively connected to the transmission for controlling the drive ratio thereof, a source of energy mounted on the towing vehicle for energizing the power operated ratio changing means, and remote control means mounted on the vehicle and operatively connecting the source of energy to the ratio changing means for changing the drive ratio of the transmission to vary the rate of discharge from the distributing mechanism while the vehicle is in motion.

References Cited by the Examiner
UNITED STATES PATENTS

| | | | |
|---|---|---|---|
| 1,394,125 | 10/21 | Stailey et al. | 74—365 |
| 1,650,594 | 11/27 | Bing | 74—365 |
| 2,736,467 | 2/56 | Durand | 222—177 |
| 3,063,599 | 11/62 | Kestel | 222—177 |
| 3,118,571 | 1/64 | Reynolds | 222—177 |

LOUIS J. DEMBO, *Primary Examiner.*

HADD S. LANE, *Examiner.*